Dec. 7, 1965 L. W. KARALUS 3,222,205

RECORDING TAPE

Filed Feb. 15, 1963 2 Sheets-Sheet 1

INVENTOR.
Lew W. Karalus
BY
H. Gibner Lehmann
AGENT

INVENTOR.
Lew W. Karalus
BY
H. Gilmer Lehmann
AGENT

United States Patent Office 3,222,205
Patented Dec. 7, 1965

3,222,205
RECORDING TAPE
Lew W. Karalus, 925 William St., Bridgeport, Conn.
Filed Feb. 15, 1963, Ser. No. 258,688
1 Claim. (Cl. 117—27)

The present application is a continuation-in-part of my copending application Serial No. 804,702, filed April 7, 1959, and entitled "Adhesive Tape With Permanent Magnets Therein and Method of Forming Same," now Patent No. 3,078,183.

This invention relates to recording tapes, and more particularly to tapes of the type adapted to have magnetic patterns formed in them, representing audio and video information or data.

In this prior application I disclosed and described an improved adhesive tape with permanent magnets therein which is so constituted that it can have more permanent magnet particles per square inch than prior known recording tapes, such construction involving a placement of the permanent magnet particles in such a manner that their polar axes are either normal to the plane of the tape or else substantially so. I have found that such alignment and arrangement of the permanent magnet particles in perpendicular relation or substantially perpendicular relation to the plane of the carrier is ideal for sound and video recording use, since the increased number of particles when placed side-by-side vertically, constitutes a heavier concentration of permanent magnet material. A lower gain level may thus be employed, resulting in an improvement in the ratio of surface noise to signal. Such arrangement readily lends itself to a disposition of the magnet particles on a thin tape or strip-like base which may be of non-magnetic material such as aluminum, plastic or the like whereby there is minimized the likelihood of print-through between adjoining layers of the tape when the latter is stored in a roll.

Accordingly, an object of the present invention is to provide a novel and improved recording tape for audio and video use, wherein a much greater concentration of the magnet particles per square inch is effected than is possible with prior magnetic recording tapes.

Another object is to provide an improved audio-video tape which minimizes print-through when stored in roll form.

The recording tape of the invention may be made by applying permanent magnet particles to a flexible carrier, aligning the particles in perpendicular relation to the carrier and securing the particles in spaced insulating relation and then energizing the particles so that each is in effect a permanent magnet having a north pole and a south pole. The method also incorporates the use of a plastic embedding medium which binds the permanent magnet particles to each other and to the tape, and permits alignment of the particles in parallelism and perpendicular to the plane of the tape prior to hardening of the binder material. The permanent magnet particles are aligned with all of the north poles in one direction and all of the south poles in another direction, so that when the tape is wound in a roll the north and south poles will overlie and adjoin each other, thus being attracted to each other and tending to maintain the strength of the magnetism.

A feature of the invention comprises the use of such tape in the principle of tape recording, since the special alignment enables more permanent magnet particles per square inch to be obtained than is possible with the currently used magnetic particle recording tapes.

In accordance with the invention, the permanent magnet particles may be aligned through the thickness of the carrier and may be either perpendicular to the base or plane of the carrier or else while parallel to each other arranged to make an acute angle to the plane of the carrier. Thus, each thickness of tape will have a north polarity at one side and a south polarity at the other side, allowing the tape to be rolled up without any repelling forces but instead with attracting or aiding forces which tend to strengthen the magnetism rather than weaken it.

Another object of the invention is to provide an improved recording tape in accordance with the foregoing, which tends to retain the magnetic pattern which has been incorporated in it when the tape is stored in a roll having tightly-coiled, engaging convolutions.

Still other objects of the present invention reside in the simplicity of construction of the tape itself and many utilities and advantages of the tape, when used for recording and playback involving both audio and video signals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1 and 1*a* illustrate schematically the procedure or steps in making the present improved recording tape with permanent magnet particles therein;

Figure 1:
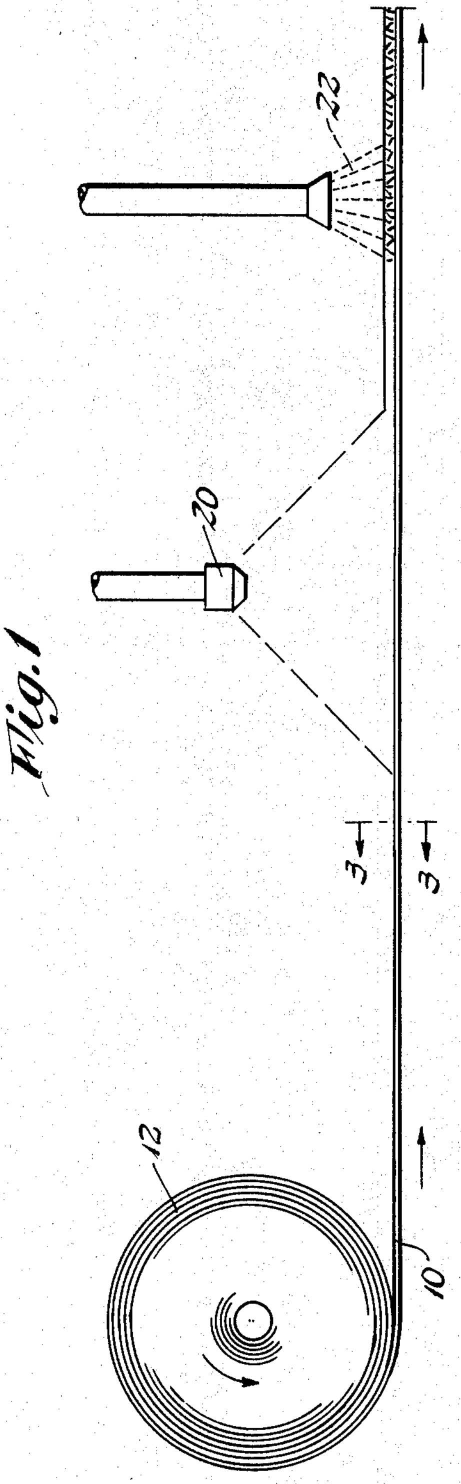
Figure 1A:
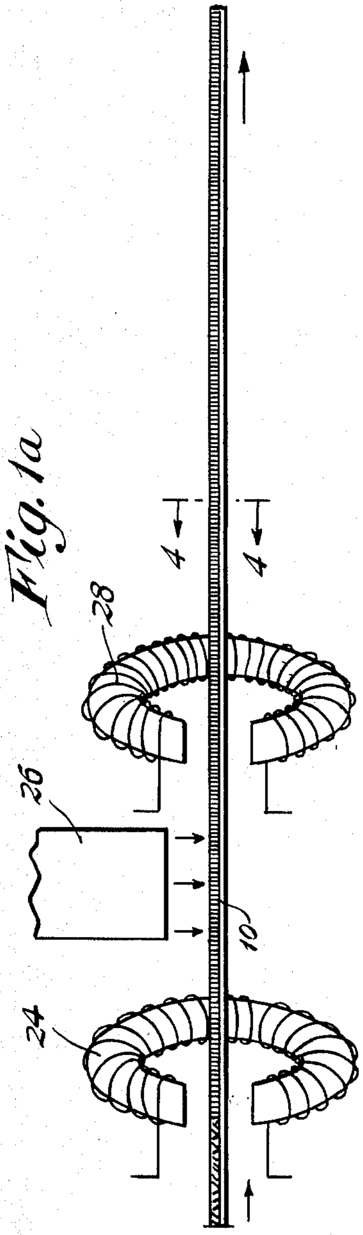

Referring to FIGURES 1 and 1*a*, a flexible carrier 10 is supplied from a roll 12 of any suitable construction, said roll being supported for rotation in any desired manner. The flexible carrier 10 may be of cloth, paper, plastic or rubber, or of aluminum or lead composition. Onto the carrier strip or tape 10 there is sprayed, by a suitable spray device 20, a thin coating of from 4 to 6 microns in thickness, of a pliable spray, plastic or lacquer substance, which may contain acrylic, vinyl or polyvinyl resins.

In accordance with the present invention, discrete permanent magnet particles 22 are sprayed onto the viscous plastic spray coating which has been applied to the carrier 10, and the particles 22 are deposited in a manner to completely cover the sprayed coating. The carrier 10 with the sprayed coating and the permanent magnet particles is then passed through the alignment coil 24 which positions the permanent magnet particles so that their polar axes are perpendicular to the base or the longitudinal axis of the carrier 10. The plastic coating substance is preferably of the fast setting type, and a dryer device 26 is optionally provided for completely drying the spray coating so as to completely set the permanent magnet particles in their given aligned relation. After the permanent magnet particles are set in the dried and stabilized coating on the carrier, the latter is passed through an energizing coil 28 which saturates the permanent magnet carrier with a high gauss or maximum number of units of flux (maxwells) that the particles can absorb, creating north polarity and south polarity at the opposite sides of the tape.

Figure 4:
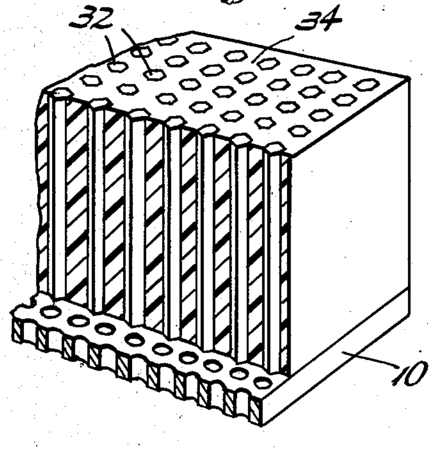
FIG. 4 is a perspective sectional view illustrating the structure or orientation of the magnetic particles of the tape and showing the carrier and magnet particles in assembled relation.
Figure 5:
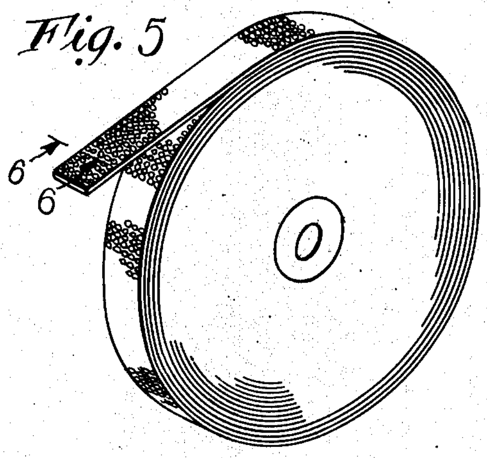
FIG. 5 is a perspective view of a roll of tape incorporating the aligned, perpendicularly disposed magnetic particles.
Figure 6:
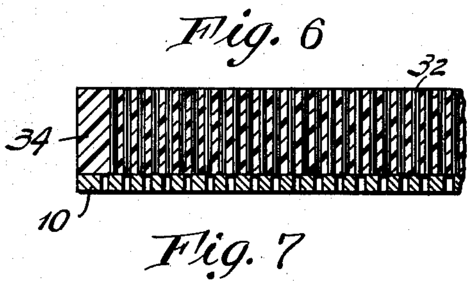
FIG. 6 is a transverse sectional view taken substantially upon a plane passing along section line 6—6 of FIG. 5, on an enlarged scale.

In FIG. 4 the carrier 10 is shown greatly enlarged. The embedded permanent magnet particles are here designated by the numeral 32, and are shown as having generally an hexagonal cross section. The set binding coating which has been applied by the spray device 20 is designated by the numeral 34, such coating or binding maintaining the alignment of the magnet particles 32. In the method of producing the recording tape, it will be noted that the alignment of the particles occurs prior to the ultimate drying or setting of the binder material, and that the magnetic saturation of the tape is effected after the drying or setting of the binder material.

The permanent magnet particles involved in the invention may be selected from the group including sintered bismonal (15,000 to 20,000 oersteds), or any other sintered or magnetic material capable of producing flux lines. The physical characteristics of these permanent magnet materials comprise an elongate and hexagonal structural shape capable of producing the high coercive force needed for permanent magnetism. The particle sizes of the permanent magnet materials will be in the micron range. Micron-size material adapts itself to high coercive force or saturation, with the particles acting as magnets. Different applications of the device will require various micron sizes, but regardless of the size the material will always be constituted of a permanent magnet substance.

The micron-size magnet particles are preferably air blown into a heated air chamber where there is also injected a fine, heated spray of lacquer or plastic substance, causing a coating of lacquer or plastic on each magnet particle. Ultrasonic sound may be used to vibrate the magnet particles while in the ultra fine heated lacquer spray or spray of suitable plastic coating material. This coating of lacquer or plastic material on each magnet particle forms each into an isolated unit which has its own magnetic system and leakage or return flux path, thereby to produce strong flux lines. Thus, the magnet particles which are isolated and which will be separated from each other by their own plastic coatings provide an ideal magnet situation, and this construction facilitates the method of making the tape, in that the binding spray coaing need only serve to retain the isolated permanent magnet particles on the carrier without regard to separation of the particles.

The alignment coil 24 is constructed to provide a magnetic field of at least 400 maxwells, or a field having the necessary number of maxwells needed for alignment of the permanent magnet particles. The air gap at the coil 24 is preferably kept at a minimum, to create a sufficient magnetic field while still permitting the carrier strip or tape to pass through. After the permanent magnet particles are physically stable, the energizing coil provides 30,000 to 40,000 maxwells, thus saturating the permanent carrier with at least the maximum number of gauss or maxwells per area that the permanent magnet particles can absorb.

Due to the special alignment of the permanent magnet particles, one side of the tape will have a north polarity and the the opposite side will have a south polarity. Thus, when the tape is wound into a roll, the adjacent touching surfaces will have north and south polarities respectively, thereby attracting each other rather than repelling each other. This tends to reduce cancellation of the magnetic fields when the tape is stored in rolled form.

Figure 2:
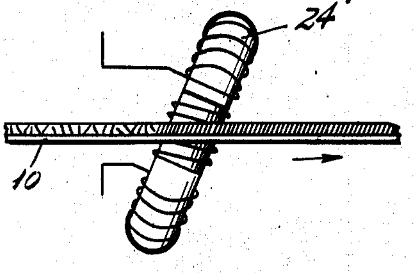
FIG. 2 is a partial elevation illustrating a tilted alignment coil for aligning the permanent magnet particles in inclined parallel relation.
Figure 3:
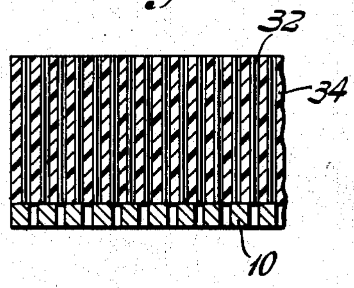
FIG. 3 is a transverse sectional view taken substantially upon a plane passing along section 4—4 of FIG. 1*a*, illustrating the construction of the tape and permanent magnet particles after alignment and energization.
Figure 7:
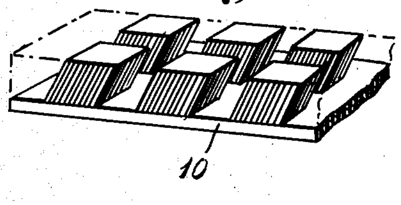
FIG. 7 is a perspective view illustrating permanent magnet particles arranged in inclined relation to the perpendicular, in relation to the flexible carrier.

As illustrated in FIG. 7 and as effected by the arrangement schematically shown in FIG. 2, the permanent magnet particles are arranged parallel to each other and have their polar axes disposed at an acute angle with respect to the plane of the base or tape carrier. The north polarity may be at the top side of the carrier, and the south polarity may be at the bottom side effecting what I term a "cross-magnetized" tape. By such organization, a greater number of magnetic particles per square inch can be placed side-by-side (extending or arranged with vertically-disposed polar axes) thus creating a heavier concentration of permanent magnet particles than is possible where the particles are placed end to end, horizontally or in any other arrangement. Moreover, there is effected a greater external field by the organization provided by the present invention, since the flux lines will emanate at the north poles and pass through the space surrounding the tape, so as to enter at the south poles. With prior tape constructions wherein the magnet particles are aligned with each other rather than disposed in parallelism, many of the flux lines will be wholly contained in the tape by virtue of the existence of complete magnetic circuits involving a number of magnet particles having adjoining north-south poles. The heavier concentration of flux produced by the hexagonal particles, in accordance with the present invention, will produce sound patterns at a lower gain level, thereby enabling a lower surface noise to be had. Permanent magnet particles of hexagonal physical shape have a higher coercive force, thereby enabling a lower gain to be employed in use.

The tape of the present invention may also employ a thin layer, such as a layer of one-half mil thickness, of non-magnetic material such as lead, aluminum, spun glass and other similar material, of non-magnetic shielding material (commercial or other grade) fused to the bases of the permanent magnet particles. This flexible non-magnetic base will prevent sound pattern print-through which is an existing problem in present recording tape constructions. In sound pattern print-through, the magnetic sound pattern is absorbed by the underlying layers of the sound tape, impairing the quality of later reproduction. By the provision of a thin layer of non-magnetic material as provided by the invention, the sound pattern is prevented from penetrating to an appreciable extent through the non-magnetic base, thereby tending to eliminate sound pattern absorption by underlying layers of the sound tape.

With modern methods of extruding or molding, substances such as ceramic, ferrous or organic permanent magnet particles may be mixed with plastic or rubber material ingredients to produce a flexible magnet carrier. The permanent magnet particles could be rendered parallel in any desired manner and located to extend in any desired direction while the plastic, or molded rubber carrier is in a pliable state. Upon cooling, the plastic, rubber or molded carrier would be energized with magnetism creating a flexible permanent magnet carrier or tape. This method would still use the alignment and magnet saturation procedure illustrated in FIGS. 1 and 1*a*.

One immediate advantage of this new tape is to minimize the demagnetizing effect of the magnetic elements on any one turn of the tape by adjacent layers directly above or below it. Another advantage is a net increase in the magnetic intensity of the tape on the whole.

By computation it has been shown that the magnetic intensity of the new tape may be as much as 60% greater than that of existing tapes. The recording head for the tape, as well as the reproducing head, may be constructed in a manner similar to the aligning and magnetizing coil assemblages 24, 24' and 28, with pole pieces adapted to be disposed on opposite sides of the tape. Such structure is therefore readily cooperable with the opposite polarities existing at the opposite faces of the tape.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A magnetic sound recording tape having non-adhesive opposite sides, comprising a thin, flexible, elongate strip adapted to be stored in roll form and having a width substantially greater than its thickness, said strip further having isolated and separated individual permanent magnet particles comprising north and south poles at opposite ends of polar axes, said particles being disposed on the strip with all of their polar axes substantially in parallelism and extending transversely of the length of the strip, said tape including binding means on one side of the strip, in which the particles are embedded and by which they are coated, said individual particles having undercoatings over which the coating of said binding means is disposed, of non-magnetic substance by which they are pre-spaced and isolated from each other, the orientation of the individual coated particles being maintained by the binding means and the spacing of the particles effected by said undercoatings enabling strong flux lines to emanate from any one magnet particle regardless of surrounding magnet particles, said undercoatings on the permanent magnet particles being disposed under the coating provided by said binding means and maintaining a positive isolation of the particles from each other.

References Cited by the Examiner

UNITED STATES PATENTS

| | | | |
|---|---|---|---|
| 2,273,916 | 2/1942 | Westerkamp | 274—46 |
| 2,313,851 | 3/1943 | Van Deventer | 272—46 |
| 2,418,479 | 4/1947 | Pratt et al. | |
| 2,566,441 | 9/1951 | Camras | 252—62.5 |
| 2,711,901 | 6/1955 | Von Behren. | |
| 2,796,359 | 6/1957 | Speed. | |
| 2,849,312 | 8/1958 | Peterman. | |
| 2,911,317 | 11/1959 | Gabor. | |
| 2,999,275 | 9/1961 | Blume | 252—62.5 |
| 3,021,230 | 2/1962 | Deriand | 117—93.2 |
| 3,023,166 | 2/1962 | Duinker et al. | |
| 3,026,215 | 3/1962 | Kukuda et al. | 117—93.2 |
| 3,051,988 | 9/1962 | Baermann. | |
| 3,052,567 | 9/1962 | Gabor et al. | |

FOREIGN PATENTS

| | | |
|---|---|---|
| 676,761 | 8/1952 | Great Britain. |
| 651,645 | 4/1951 | Great Britain. |

OTHER REFERENCES

Fabian: "Permanent Magnet Materials," Metals and Design Engineering, July 1959, pp. 108–114.

Phillips Technical Review, vol. 16, November–December 1954, pp. 141–147.

Phillips Technical Review, vol. 13, No. 7, 1951–52, pp. 194–208.

WILLIAM D. MARTIN, *Primary Examiner.*

RICHARD D. NEVIUS, MURRAY KATZ, *Examiners.*